US006865717B2

(12) United States Patent
Wright

(10) Patent No.: US 6,865,717 B2
(45) Date of Patent: Mar. 8, 2005

(54) METHOD, SYSTEM, AND PROGRAM FOR GENERATING A PROGRESS INDICATOR

(75) Inventor: Bryan John Wright, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 481 days.

(21) Appl. No.: 09/870,326

(22) Filed: May 30, 2001

(65) Prior Publication Data
US 2002/0180795 A1 Dec. 5, 2002

(51) Int. Cl.⁷ ................................................. G06F 3/00
(52) U.S. Cl. ...................... 715/772; 715/733; 715/735; 715/736; 715/760
(58) Field of Search ................................. 345/772, 764, 345/808, 733, 735, 736, 760

(56) References Cited

U.S. PATENT DOCUMENTS

| | | | | |
|---|---|---|---|---|
| 5,542,088 A | * | 7/1996 | Jennings et al. | 709/103 |
| 5,550,970 A | * | 8/1996 | Cline et al. | 345/772 |
| 5,644,334 A | | 7/1997 | Jones et al. | 345/419 |
| 5,805,166 A | * | 9/1998 | Hall et al. | 345/839 |
| 5,911,779 A | * | 6/1999 | Stallmo et al. | 714/6 |
| 5,986,992 A | * | 11/1999 | Bardmesser | 369/77.2 |
| 6,014,141 A | | 1/2000 | Klein | 345/835 |
| 6,023,698 A | * | 2/2000 | Lavey et al. | 707/10 |
| 6,097,390 A | | 8/2000 | Marks | 345/772 |
| 6,100,887 A | | 8/2000 | Bormann et al. | 345/764 |
| 6,104,397 A | | 8/2000 | Ryan et al. | 345/846 |
| 6,338,072 B1 | * | 1/2002 | Durand et al. | 707/205 |

OTHER PUBLICATIONS

U.S. Department of Education Office of the Chief Information Officer, "Requirements for Accessible Electronic and Information Technology Design", [online] Version 2.0, Feb. 1, 2001, [Retrieved on Apr. 30, 2001]. Retrieved from the Internet at <URL: http://gcs.ed.gov/coninfo/clibrary/software.htm>.

U.S. patent application Ser. No. 09/149,053, filed on Sep. 8, 1998, entitled, "Progress Indicator for Multiple Actions", invented by R.C. Nielsen.

* cited by examiner

Primary Examiner—Raymond J. Bayerl
Assistant Examiner—Kieu D. Vu
(74) Attorney, Agent, or Firm—David W. Victor; Konrad Raynes & Victor LLP

(57) ABSTRACT

Provided is a method, system, and program for generating a status page to display on a computer display. A request for status information on a resource is received. A determination is made of an operation being performed with respect to the resource. Data is generated to display a progress bar indicating a percent of the operation that has completed. A first part of the progress bar indicates a percent of the operation that has completed and a second part of the progress bar indicates a percent of the operation that has not completed. A determination is made of an attribute of the operation. Data is then generated to display information with one of the first part or second part of the progress bar indicating the determined attribute of the operation.

45 Claims, 3 Drawing Sheets

METHOD, SYSTEM, AND PROGRAM FOR GENERATING A PROGRESS INDICATOR

BACKGROUND OF THE INVENTION

1. Field of the Invention

The present invention relates to a method, system, and program for generating a progress indicator.

2. Description of the Related Art

In network storage systems where multiple host systems access a common storage system on a network, such as a Redundant Array of Independent Disks (RAID) array, users may query the storage system to determine status information. Notwithstanding that users can access information on the status of the storage system, there is a continual need in the art for improved user interfaces that present information on the status of storage systems in a format that is both ergonomical and accessible to the user.

SUMMARY OF THE PREFERRED EMBODIMENTS

Provided is a method, system, and program for generating a status page to display on a computer display. A request for status information on a resource is received. A determination is made of an operation being performed with respect to the resource. Data is generated to display a progress bar indicating a percent of the operation that has completed. A first part of the progress bar indicates a percent of the operation that has completed and a second part of the progress bar indicates a percent of the operation that has not completed. A determination is made of an attribute of the operation. Data is then generated to display information with one of the first part or second part of the progress bar indicating the determined attribute of the operation.

In further implementations, the determined attribute is capable of having one of multiple values. The data to display the information indicating the determined attribute further indicates the determined attribute value, wherein different information is displayed for each attribute value.

Still further, displaying the first or second part with information comprises displaying the first or second part of the bar in a manner that conveys the information indicating the determined attribute value of the operation. In certain implementations, the information is conveyed by displaying the first or second part of the bar in a color that is associated with the determined attribute value of the operation, wherein there are different colors associated with different attribute values.

In further implementations, the resource comprises a storage device and the operation comprises a formatting operation performed with respect to the storage device.

Yet further, the storage device may includes multiple interfaces, wherein each interface is capable of engaging one storage unit. Data is generated to display information on the status of each interface with the displayed progress bar. The information is capable of indicating that each interface is empty or includes an available storage unit, wherein the formatting operation is performed with respect to the available storage units engaged with the interfaces.

The described implementations provide an improved technique for displaying status of an operation performed with respect to a resource by displaying additional attribute information on the operation with the progress bar indicating a percent of the operation that has completed.

BRIEF DESCRIPTION OF THE DRAWINGS

Referring now to the drawings in which like reference numbers represents corresponding parts throughout.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1:
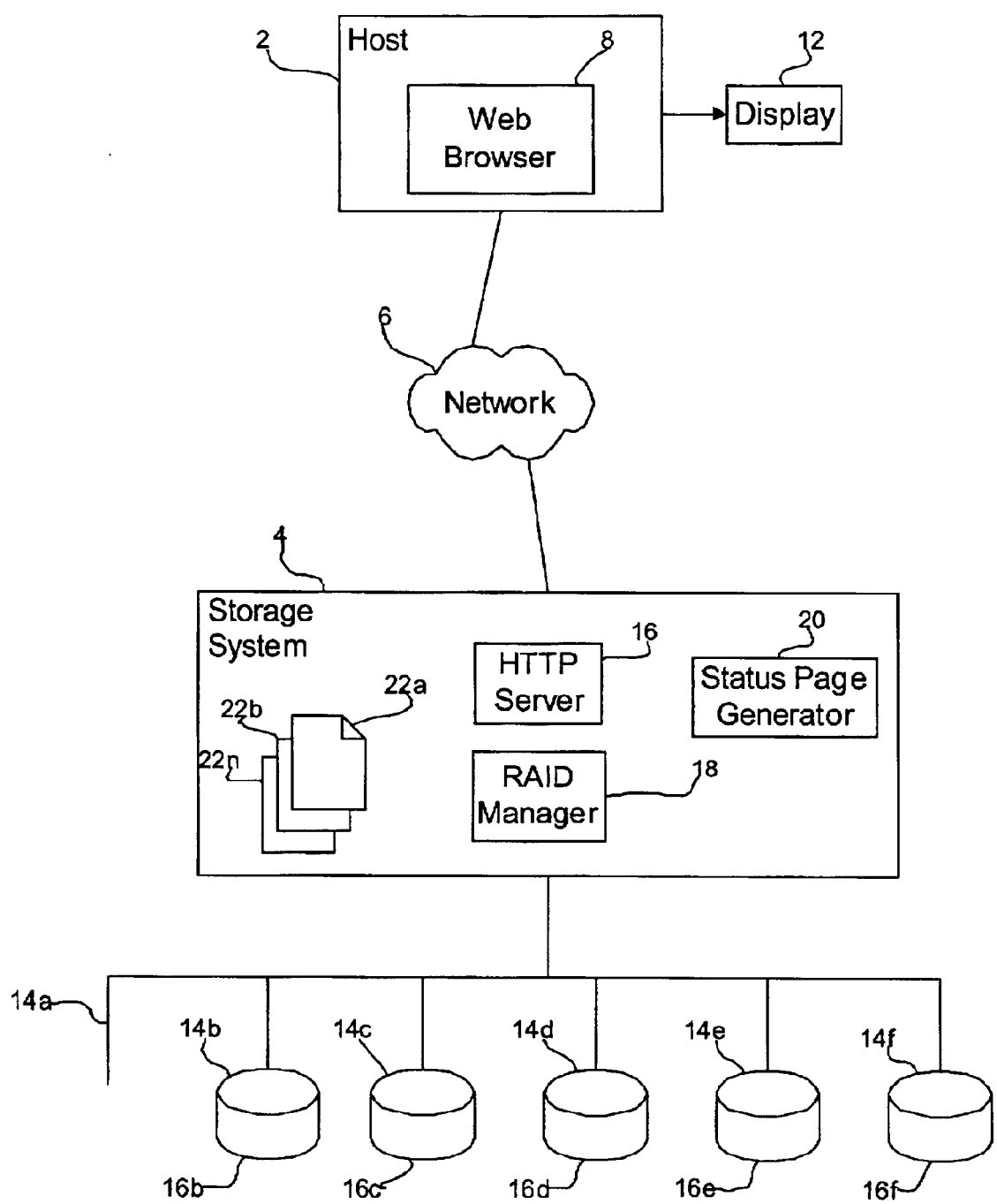
FIG. 1 is a block diagram illustrating a computing environment in which aspects of the invention are implemented.

FIG. 1 illustrates a computing environment in which aspects of the invention are implemented. A host system 2 is capable of communication with a storage system 4 over a network 6, such as a Local Area Network (LAN), Wide Area Network (WAN), Storage Area Network (SAN), the Internet, an Intranet, etc., using a network protocol known in the art, e.g., Ethernet, Fibre Channel, TCP/IP, HyperText Transfer Protocol (HTTP), File Transfer Protocol (FTP), Fibre Channel, etc. The host 2 includes a browser program 8, such as an Hypertext Markup Language (HTML) browser, capable of downloading and rendering content from the storage system 4, which in certain described implementations includes an HTTP server 16 communicating using the HTTP protocol. However, the storage system 4 may use alternative communication protocols known in the art to communicate with devices over the network 6.

The host system 2 may comprise any computer device known in the art capable of communicating over a network 6 and rung a web browser program 8, such as a personal computer, workstation, mainframe, server, telephony device, hand held computer, etc. A display monitor 12 is attached to the host 2 and capable of displaying output from the browser program 8.

In one implementation, the storage system 4 comprises a RAID storage system including multiple slots 14a, b, c , e, f on a backplane for interfacing with hard disk drives 16b, c, d, e, f as known hi the RAID array art. The slots 14a, b, c, d, e, f may comprise an Integrated Drive Electronics (IDE) interface, Small Computer System Interface (SCSI), or any other interface known in the art. FIG. I shows one slot 14a, of the array having no attached storage device. The storage system 4 further includes a RAID 18 manager including the software and code to manage the hard disk drives 16a, b, c, d, e, f, as a RAID array and perform other RAID management operations known in the art. The RAID manager 18 further includes application programming interfaces (APIs) that are capable of causing the RAID manager 18 to determine the status of the hard disk drives 16b, c, d, e, f, including the status of any rebuilding operations, failures, recovery, etc., in a manner known in the art. The RAID manager 18 would return information to the calling program after executing the APIs.

A status page generator 20 comprises a program that is capable of calling RAID manager 18 APIs to determine the status of physical and logical storage devices in the disks 16b, c, d, e, f and then adding such information to the web page templates 22a, b . . . n. The generated web pages 22a, b . . . n including current status information are returned to the requesting host 2 through the HTTP server 16. The status page generator 20 may comprise a Common Gateway Interface (CGI) program, a Java Servlet, or any other application program capable of calling API methods to access data to add to a web page template 22a, b . . . n.

In alternative implementations, the web pages 22a, b, c may comprise programs, such as script programs or Java Applets, that execute on the host 2. In such implementations, the program executing on the host 2 may submit the API methods to the storage system 4 to access the status information from the RAID manager 18 directly. In implementations where the program executes on the host, the program may execute within the web browser 8 to display data within the display region of the web browser 8 in a manner known in the art.

In the described implementations, the RAID manager 18 would include RAID algorithms to rebuild the RAID storage space or logical drive in response to a reconfiguration of the logical array, such as adding or removing storage space, or in response to a failure. If there is a failure of one or more of the hard disk drives 16b, c, d, e, f, then the RAID manager 18 may rebuild the logical storage space using the data and parity information on the surviving disks 16b, c, d, e, f. In the event of a failure, a new disk may be used in the rebuilding operation. The new disk may comprise a hot spare already engaged with a port 14a, b, c, e, for a new disk substituted for the failed disk. The RAID manager 18 is further capable of implementing APIs to access information on the current status of physical and logical disk drives in a manner known in the art.

Figure 2:
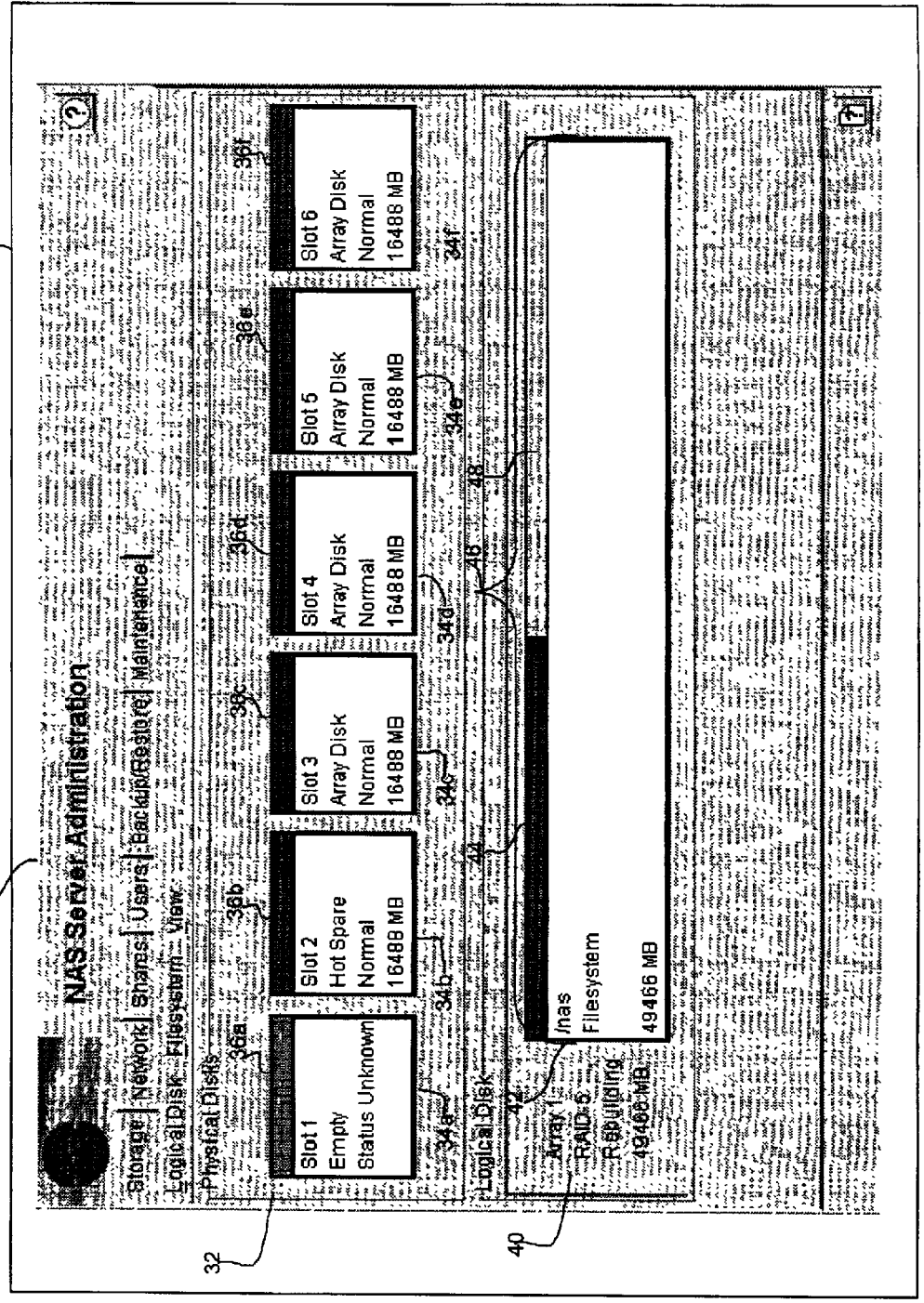
FIG. 2 illustrates an example of a display of status information in accordance with implementations of the invention.

FIG. 2 illustrates a page 30 displayed in the monitor 12 by the browser 8 providing status information on the rebuilding operation. The page is generated by the status page generator 20 using RAID manager 18 APIs to access status information. A section 32 labeled "Physical Disks" shows the current status of each of the slots 14a, b, c, d, e. The physical disk section 32 displays slot graphical elements 34a, b, c, d, e, f that provide information on the current status of each slot 14a, b, c, d, e, f. In the example of FIG. 2, the slot graphical element 34a indicates that slot 1 is empty, the slot graphical element 34b indicates that slot 2 includes a hot spare that is not currently used in an active logical array, and slot graphical elements 34c, d, e, f indicate that the slots include disk drives 16c, d, e, fused in a logical array. The slot graphical elements 34a, b, c, d, e, f are displayed with a slot bar 36a, b, c, d, e, f that is displayed in different colors, where the color in which the bar 36a, b, c, d, e, f is displayed represents a state of the slot. For instance, one color may indicate that the slot is empty, another color may indicate that the slot includes a disk that is a hot spare, i.e., not used in any array, and another color may indicate that the slot includes a disk used in a logical array. Alternatively, one color may indicate that there is no ready disk in a slot 14a, b, c, d, e, f and another color may indicate that there is a ready disk 16b, c, d, e, f in the slot, whether or not the disk is a hot spare or in use in an array.

The status page 30 further includes a "Logical Disk" section 40 providing status information on an operation performed with respect to the disks 16b, c, d, e, f in an array. The logical disk section 40 displays a progress indicator 42, having a moving portion 44 that moves across a bar 46 as the operation monitored by the progress indicator 42 progresses towards completion. The percentage of the job completed would approximate the percentage length the moving portion 44 extends across the bar 46. The percent the job remains uncompleted is represented as an uncompleted portion 48 color displayed to the right of the moving portion 44 in a different color. The uncompleted portion 48 would extend a percentage length across the bar that is equivalent to the percentage of the job uncompleted. When the operation completes, the entire bar 46 will be displayed as the color of the moving portion 44. In one implementation, the moving portion 44 may be displayed in one color, indicating a percentage of the array that is rebuilt, and the uncompleted portion 48 may be displayed in one of multiple other colors. The different colors used to display the uncompleted portion 48 may convey the reason for the operation being invoked, where different colors may be used to convey different reasons for invoking the operation being monitored by the progress indicator 42.

For instance, in implementations where the progress indicator 42 monitors the status of an operation rebuilding a disk array, one color used to display the uncompleted portion 48 may indicate that the rebuilding operation is being performed to provide a different configuration of the storage space assigned to the logical array, such as adding or removing storage space from the logical array. Another color for the uncompleted portion 48 may indicate that the rebuilding operation is performed to rebuild the array after a failure of one of the disks 16b, c, d, e, f.

The logical disk section 40 further provides textual information on the operation, such as rebuilding, the array, and array size. If the entire logical array is available to users, then the entire bar 46 would be displayed in a color indicating full availability.

Figure 3:
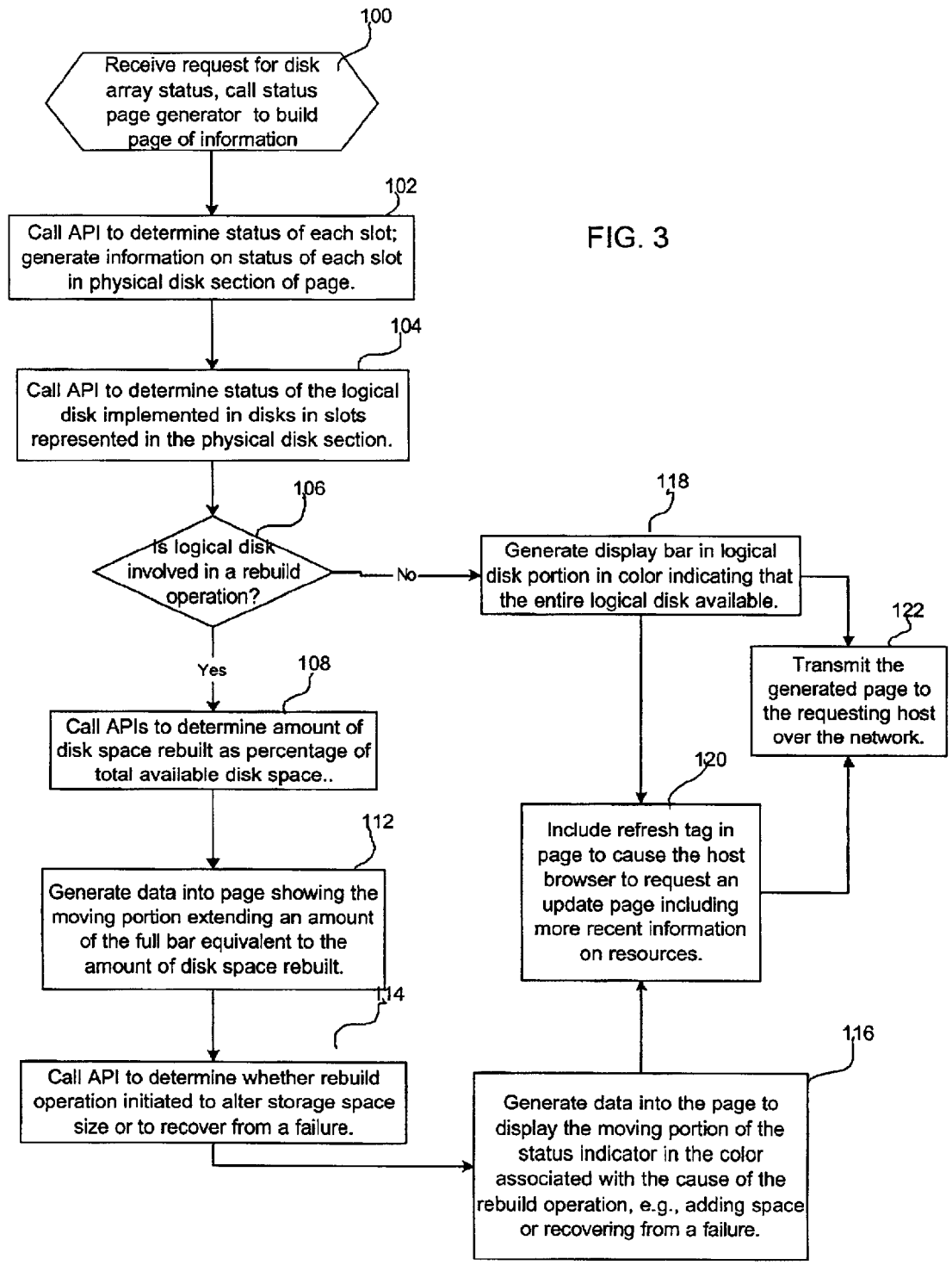
FIG. 3 illustrates logic to generate data to display status information in accordance with implementations of the invention.

FIG. 3 illustrates logic implemented in the status page generator 20 to build a page 22a, b . . . n providing information on the status of the disks 16a, b, c, d, e, f in the RAID array. Control begins at block 100 with the status page generator 20 receiving a request for a page 22a, b . . . n including status on the physical and logical disks in the storage system 4. In response to the request, the status page generator 20 calls (at block 102) the RAID manager 18 with an API to have the RAID manager determine the status of each slot 14a, b, c, d, e, f in the array. The status page generator 20 then adds slot status information returned by the RAID manager 18 to the pages 22a, b . . . n to display the information on the status of the slots 14a, b, d, e, f, such as the slot bars 36a, b, c, d, e, f. In certain implementations, the color of the slot bars 36a, b, c, d, e, f indicates the current slot status, i.e., not engaged with a disk, rebuilding, available, etc.

The status page generator 20 then calls (at block 104) the RAID manager 18 with an API to determine the current status of one or more logical disks, e.g., logical arrays or volumes, implemented in the disk drives 16b, c, d, e, f. If (at block 106) the logical disk is involved in a rebuild operation, then the status page generator 20 calls (at block 108) the RAID manager 18 with an API to determine the amount of disk space rebuilt as a percentage of the total disk space in the logical array. The status page generator 20 then generates (at block 112) data into the page 22a, b . . . n to display the moving portion 44 extending across a percentage of the bar 46 equivalent to the percentage of the disk space that has been rebuilt. The status page generator 20 further calls the RAID manager 18 with an API to determine whether the rebuild operation was initiated to reconfigure (add or remove) storage space to the logical disk or as part of a failure recovery operation. Data is added to the page 22a, b . . . n to display the moving portion 44 of the status indicator in the color associated with the cause of the rebuild operation, e.g., one color may be used to indicate rebuilding is performed to modify or reconfigure the amount of space assigned to the logical disk and another color may be used to indicate rebuilding is performed in response to a failure recovery operation. Still further, additional colors may be used to provide further state information. For instance, one color may be used to indicate that the rebuild operation is being performed to add space to the array and another color used to indicate that the rebuild operation is removing space from the array.

If (at block 106) the logical disk is not involved in a rebuilding operation, then the status page generator 20 adds (at block 118) data to the page 22a, b . . . n to display the moving portion 44 in a color indicating that the entire logical array is available for Input/Output (I/O) operations. A refresh tag is added (at block 120) to the generated page 22a, b . . . n to cause the host browser 8 to automatically periodically access the status page 22a, b . . . n to obtain more current status and progress indicator 42 data. The HTTP server 16 then transmits (at block 122) the generated status page 22a, b . . . n to the host web browser 8 for rendering and display at the host display 12.

The described implementations provide a technique for displaying information on the status of a storage device, such as a RAID array, that integrates different types of information into the display to allow the user to not only view the operation that is occurring, but to also concurrently view information with the progress indicating reasons for the operation and a state that will exist after the operation completes. For instance, in the described storage array implementation, the progress indicator 42 provides information that allows the user to determine the state of the storage system 4 after the operation completes. If the uncompleted portion 48 is displayed in a color that indicates that the rebuild is performed to reconfigure the logical disk, then the user will know that at the end of the rebuild the logical disk will have a new configuration, e.g., more or less storage space. On the other hand, if the uncompleted portion 48 is displayed in a color associated with failure recovery operations, then the user will know that an error occurred and that after the rebuild operation completes, the system will have recovered from some failure. Other colors may also be used to indicate additional causes or further detail on the rebuild or other operation being tracked by the progress indicator 42 that indicates the state that will exist at the storage system 4 after the rebuild completes. For instance, one color may indicate that the rebuild is being performed to add storage space to the logical disk, and another color may be used to indicate that storage space is being removed.

With the described implementations, the moving portion 44 is displayed in a color indicating the state of the system that will exist upon the completion of the operation whose progress is represented by the moving portion 44. In the storage system implementations, the color used to display the moving portion 44 may indicate that the storage space will be available when the operation completes. The uncompleted portion 48 is displayed in the color that indicates the reason that triggered the operation, indicating the current state of the uncompleted portion of the array and also conveying information on the state after the rebuild, i.e., a logical disk that has been reconfigured or recovered from a failure.

Additional Implementation Details

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the described implementations, the progress indicator 42 displays the percentage of a rebuild operation that has completed. The progress indicator 42 may be used to indicate the percent completed with respect to any other process, where the uncompleted part of the bar 28 would indicate the current state of the monitored system. The operation represented by the moving portion 44 may have been invoked in response to the state represented by the color of the uncompleted portion 48 of the bar 44.

In the described implementations, the storage system 4 comprised a RAID array of multiple hard disk drives. In alternative implementations, the storage system may comprise other types of storage systems, such as a Direct Access Storage Device (DASD), Just a Bunch of Disks (JBOD), a tape library having backplane interfaces for multiple tape cartridges, optical disk library, etc.

In the described implementations, the operation monitored by the progress indicator 42 is a rebuild operation. Additionally, the monitored operation may comprise any formatting operation performed with respect to the storage device(s) in the storage system.

The progress indicator implementation described herein may apply to monitor systems other than storage systems, such as printing systems, application programs, database systems, file systems, and other Input/Output (I/O) devices.

The display of FIG. 2 monitored the status of an operation being performed with respect to a single device, i.e., the storage system 2. Additionally, the progress indicator implementation described herein may monitor the progress of one or more operations on multiple systems.

In the described implementations, the colors of the moving portion 44 and uncompleted portion 48 were displayed in a color indicating a state of the storage areas represented by the bar 46. For instance, the color of the moving portion 44 indicates that the state of the percent of the storage space rebuilt is available and the color of the uncompleted portion 48 indicates that the state of the storage space is unavailable due to failure or a reconfiguration of the space. Additionally, the color in which the progress indicator is displayed may indicate any other attribute of the resource associated with the moving or uncompleted portion of the bar. Thus, the area of the bar 46 occupied by the moving 44 and uncompleted 46 portions indicate the resources, or percentage of resources, associated with the bar and the color in which the bar is displayed represents a state or attribute associated with the resource on which the operation is performed.

In the described implementations, the state of the resource associated with the bar portions 44 and 48 was represented by displaying the bar portions 44 and 48 in different color schemes. Alternatively, different techniques may be used to convey the state or attributes associated with the portions 44 and 48, including textual information displayed with the portions 44 and 48, different shapes or designs used for the different portions 44 and 48, etc.

The logic of FIG. 3 is for illustrative purposes. Additional or alternative steps may be performed in addition to those illustrated in the logic. Further, the order of he steps in the preferred logic may also vary.

The foregoing description of the described implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for generating a status page to display on a computer display, comprising:

receiving a request for status information on a resource;

determining an operation being performed with respect to the resource, wherein the operation is one of a management operation for the resource;

generating data to display a progress bar indicating a percent of the operation that has completed, wherein a first part of the progress bar indicates a percent of the operation that has completed and a second part of the progress bar indicates a percent of the operation that has not completed;

determining an attribute of the operation, wherein the determined attribute indicates a reason the operation is being performed; and generating data to display information with one of the first part or second part of the progress bar indicating the determined attribute of the operation, wherein the data to display information indicating the determined attribute of the operation indicates a reason the operation is being performed and wherein the data to display the progress bar indicates a percent of the operation that has completed and a percent of the operation that has not completed.

2. The method of claim 1, wherein the operation is a rebuild operation and wherein the determined attribute indicates whether the reason the operation is being performed is to reconfigure a storage space or as part of a failure recovery operation.

3. The method of claim 1, wherein the determined attribute is capable of having one of multiple values, wherein the data to display the information indicating the determined attribute further indicates the determined attribute value, wherein different information is displayed for each attribute value.

4. The method of claim 1, wherein the information indicating the determined attribute is displayed with the second part of the progress bar and further indicates a state of the resource after the operation completes.

5. The method of claim 4, wherein generating data to display the first or second part with information comprises displaying the first or second part of the progress bar in a manner that conveys the information indicating the determined attribute value of the operation.

6. The method of claim 5, wherein displaying the first or second part of the progress bar in the manner that conveys the information comprises displaying the first or second part of the progress bar in a color that is associated with the determined attribute value of the operation, wherein there are different colors associated with different attribute values.

7. The method of claim 1, wherein the resource comprises a storage device and the operation comprises a formatting operation performed with respect to the storage device.

8. The method of claim 7, wherein the determined attribute is capable of indicating one of multiple possible sources of the formatting operation, wherein the generated data to display the information indicating the determined attribute further indicates the determined source of the formatting operation, and wherein different information is displayed for each different source.

9. The method of claim 8, wherein the formatting operation comprises a rebuild operation to reconstruct a storage space in the storage device, wherein the source of the formatting operation is capable of comprising a modification to the configuration or a failure within the storage device.

10. The method of claim 9, wherein displaying the first or second part of the progress bar with information comprises displaying the first or second part of the progress bar in a color that is associated with the determined source of the rebuild operation.

11. The method of claim 7, wherein the storage device includes multiple interfaces, wherein each interface is capable of engaging one storage unit, further comprising:

generating data to display information on the status of each interface with the displayed progress bar, wherein the information is capable of indicating that each interface is empty or includes an available storage wilt, wherein the formatting operation is performed with respect to the available storage units engaged with the interfaces.

12. The method of claim 11, wherein the information on the status of each interface is further capable of indicating whether the interface is engaged with a storage unit that is available as a hot spare for use if one available storage unit engaged with another interface fails.

13. The method of claim 12, wherein the storage device comprises a Redundant Array of Independent Disks (RAID) and the storage units comprise hard disk drives, and wherein the formatting operation is performed with respect to a logical storage space that spans multiple of the available storage units.

14. The method of claim 7, wherein the storage device includes a network interface and performs the steps of receiving the request for status information and generating the data to display, wherein the request is received from a computer over the network, further comprising:

adding the data to a file; and transmitting the file over the network to the computer submitting the request.

15. The method of claim 14, wherein the file is capable of being rendered by an Internet browser program.

16. A system for generating a status page to display on a computer display, comprising:

means for receiving a request for status information on a resource;

means for determining an operation being performed with respect to the resource, wherein the operation is one of a management operation for the resource;

means for generating data to display a progress bar indicating a percent of the operation that has completed, wherein a first part of the progress bar indicates a percent of the operation that has completed and a second part of the progress bar indicates a percent of the operation that has not completed;

means for determining an attribute of the operation, wherein the determined attribute indicates a reason the operation is being performed; and means for generating data to display information with one of the first part or second part of the progress bar indicating the determined attribute of the operation, wherein the data to display information indicating the determined attribute of the operation indicates a reason the operation is being performed and wherein the data to display the progress bar indicates a percent of the operation that has completed and a percent of the operation that has not completed.

17. The system of claim 16, wherein the operation is a rebuild operation and wherein the determined attribute indicates whether the reason the operation is being performed is to reconfigure a storage space or as part of a failure recovery operation.

18. The system of claim 16, wherein the determined attribute is capable of having one of multiple values, wherein the data to display the information indicating the determined attribute further indicates the determined attribute value, and wherein different information is displayed for each attribute value.

19. The system of claim 16, wherein the information indicating the determined attribute is displayed with the second part of the progress bar and further indicates a state of the resource after the operation completes.

20. The system of claim 19, wherein the means for generating data to display the first or second part with information includes data to display the first or second part of the progress bar in a manner that conveys the information indicating the determined attribute value of the operation.

21. The system of claim 20, wherein the means for generating data in the manner that conveys the information generates data to display the first or second part of the progress bar in a color that is associated with the determined attribute value of the operation, wherein there are different colors associated with different attribute values.

22. The system of claim 16, wherein the resource comprises a storage device and the operation comprises a formatting operation performed with respect to the storage device.

23. The system of claim 22, wherein the determined attribute is capable of indicating one of multiple possible sources of the formatting operation, wherein the generated data to display the information indicating the determined attribute further indicates the determined source of the formatting operation, and wherein different information is displayed for each different source.

24. The system of claim 23, wherein the formatting operation comprises a rebuild operation to reconstruct a storage space in the storage device, wherein the source of the formatting operation is capable of comprising a modification to the configuration or a failure within the storage device.

25. The system of claim 24, wherein generating data to display the first or second part of the progress bar with information generates data to display the first or second part of the progress bar in a color that is associated with the determined source of the rebuild operation.

26. The system of claim 22, wherein the storage device includes multiple interfaces, wherein each interface is capable of engaging one storage unit, further comprising:

means for generating data to display information on the status of each interface with the displayed progress bar, wherein the information is capable of indicating that each interface is empty or includes an available storage unit, and wherein the formatting operation is performed with respect to the available storage units engaged with the interfaces.

27. The system of claim 26, wherein the information on the status of each interface is further capable of indicating whether the interface is engaged with a storage unit that is available as a hot spare for use if one available storage unit engaged with another interface fails.

28. The system of claim 27, wherein the storage device comprises a Redundant Array of Independent Disks (RAID) and the storage units comprise hard disk drives, and wherein the formatting operation is performed with respect to a logical storage space that spans multiple of the available storage units.

29. The system of claim 22, wherein the storage device includes a network interface and performs receiving the request for status information and generating the data to display, wherein the request is received from a computer over the network, further comprising:

means for adding the data to a file; and means for transmitting the file over the network to the computer submitting the request.

30. The system of claim 29, wherein the file is capable of being rendered by an Internet browser program.

31. An article of manufacture including code for generating a status page to display on a computer display by:

receiving a request for status information on a resource;

determining an operation being performed with respect to the resource, wherein the operation is one of a management operation for the resource;

generating data to display a progress bar indicating a percent of the operation that has completed, wherein a first part of the progress bar indicates a percent of the operation that has completed and a second part of the progress bar indicates a percent of the operation that has not completed;

determining an attribute of the operation, wherein the determined attribute indicates a reason the operation is being performed; and generating data to display information with one of the first part or second part of the progress bar indicating the determined attribute of the operation wherein the data to display information indicating the determined attribute of the operation indicates a reason the operation is being performed and wherein the data to display the progress bar indicates percent of the operation that has completed and a percent of the operation that has not completed.

32. The article of manufacture of claim 31, wherein the operation is a rebuild operation and wherein the determined attribute indicates whether the reason the operation is being performed is to reconfigure a storage space or as part of a failure recovery operation.

33. The article of manufacture of claim 31, wherein the determined attribute is capable of having one of multiple values, wherein the data to display the information indicating the determined attribute further indicates the determined attribute value, wherein different information is displayed for each attribute value.

34. The article of manufacture of claim 31, wherein the information indicating the determined attribute is displayed with the second part of the progress bar and further indicates a state of the resource after the operation completes.

35. The article of manufacture of claim 34, wherein generating data to display the first or second part with information comprises displaying the first or second part of the progress bar in a manner that conveys the information indicating the determined attribute value of the operation.

36. The article of manufacture of claim 35, wherein displaying the first or second part of the progress bar in the manner that conveys the information comprises displaying the first or second part of the progress bar in a color that is associated with the determined attribute value of the operation, wherein there are different colors associated with different attribute values.

37. The article of manufacture of claim 31, wherein the resource comprises a storage device and the operation comprises a formatting operation performed with respect to the storage device.

38. The article of manufacture of claim 37, wherein the determined attribute is capable of indicating one of multiple possible sources of the formatting operation, wherein the generated data to display the information indicating the determined attribute further indicates the determined source of the formatting operation, and wherein different information is displayed for each different source.

39. The article of manufacture of claim 38, wherein the formatting operation comprises a rebuild operation to reconstruct a storage space in the storage device, wherein the source of the formatting operation is capable of comprising a modification to the configuration or a failure within the storage device.

40. The article of manufacture of claim 39, wherein displaying the first or second part of the progress bar with information comprises displaying the first or second part of the progress bar in a color that is associated with the determined source of the rebuild operation.

41. The article of manufacture of claim 37, wherein the storage device includes multiple interfaces, wherein each interface is capable of engaging one storage unit, further comprising:

generating data to display information on the status of each interface with the displayed progress bar, wherein the information is capable of indicating that each interface is empty or includes an available storage unit, wherein the formatting operation is performed with respect to the available storage units engaged with the interfaces.

42. The article of manufacture of claim 41, wherein the information on the status of each interface is further capable of indicating whether the interface is engaged with a storage unit that is available as a hot spare for use if one available storage unit engaged with another interface fails.

43. The article of manufacture of claim 42, wherein the storage device comprises a Redundant Array of Independent Disks (RAID) and the storage units comprise hard disk drives, and wherein the formatting operation is performed with respect to a logical storage space that spans multiple of the available storage units.

44. The article of manufacture of claim 37, wherein the storage device includes a network interface and performs the steps of receiving the request for status information and generating the data to display, wherein the request is received from a computer over the network, further comprising:

adding the data to a file; and transmitting the file over the network to the computer submitting the request.

45. The article of manufacture of claim 44, wherein the file is capable of being rendered by an Internet browser program.

* * * * *